united States Patent Office 3,639,589
Patented Feb. 1, 1972

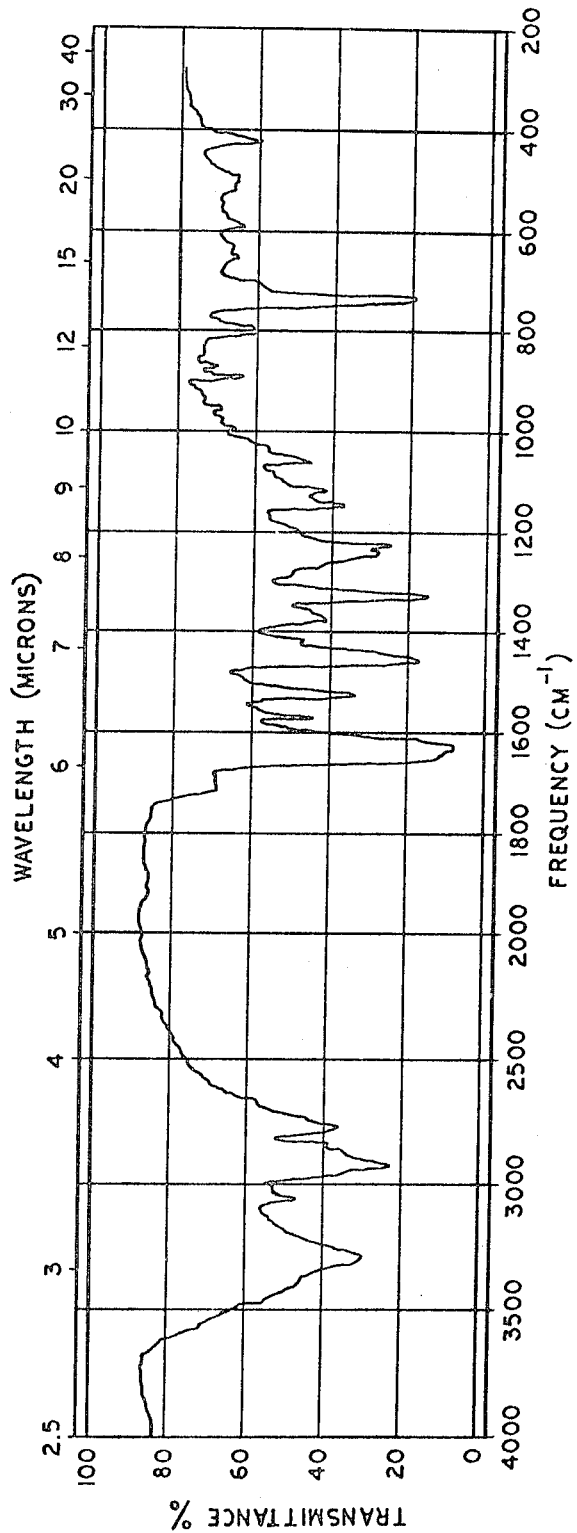

3,639,589
PHARMACOLOGICALLY EFFECTIVE SUBSTANCE AND PROCESS FOR ISOLATING IT FROM *HAZUNTA GRACILIFLORA*
Alfred Groebel, Bad Soden, Taunus, Germany, assignor to Farbwerke Hoechst Aktiengesellschaft vormals Meister Lucius & Bruning, Frankfurt am Main, Germany
Filed Feb. 13, 1968, Ser. No. 705,117
Claims priority, application Germany, Feb. 16, 1967, F 51,541
Int. Cl. A61k 27/00
U.S. Cl. 424—195
2 Claims

ABSTRACT OF THE DISCLOSURE

A pharmacologically active substance having spasmolytic and vasodilatatory effect isolated from *Hazunta graciliflora* and a process for isolating said substance from the plant material by alcohol extraction.

---

The present invention relates to a pharmacologically effective substance and a process for isolating it.

We have found that a crystalline substance having high spasmolytic and vasodilatatory activity can be isolated from *Hazunta graciliflora*.

*Hazunta graciliflora* is a small tree belonging to the family Apocynaceae which is found, like other species of the genus Hazunta, in the coastal regions of southern and western Madagascar.

The pharmacologically effective substance can be obtained by subjecting dried material of *Hazunta graciliflora*, especially the wood and bark thereof, if necessary after previous removal by extraction of waxes, fats or sterols, to an extraction procedure with lower alcohols, preferably methanol or ethanol, or with, preferably aliphatic, halogenated hydrocarbons, for example, chloroform or methylene chloride, and purifying the resulting extract in known manner.

A preferred method of such purification consists in evaporating the extract to dryness under reduced pressure and subjecting the residue obtained to an extraction with dilute acids. The extract is then filtered and the acid solution is rendered alkaline. The precipitate that separates is again subjected to extraction with ether or chloroform and, for further purification, the extract is chromatographed on an adsorbent.

The dilute acids used for the extraction of the plant extract which has been concentrated by evaporation are preferably 0.1 N to 2 N acids. Hydrochloric acid or sulfuric acid is preferably used. The active principle is precipitated from the acid solution, for example by means of solid caustic potash or caustic soda, the pH optimum being at 10–11. Further purification is carried out by renewed extraction of the precipitate, preferably in a Soxhlet extractor. For this purpose, an ether, for example diethyl ether or di-isopropyl ether, is preferably used as the solvent. For the final chromatographic purification, preferably silica gel or aluminum oxide (neutral) is used as adsorbent. The active principle crystallizes from the filtrate in form of yellow rodlets and can be obtained in the form of colorless leaflets by recrystallization from ethanol or benzene. The substance is characterized by the following physical data:

Melting point 235° C.
Analysis (percent): C, 69.8; H, 7.0; O, 15.1; N, 8.1.

Molecular weight: 398 (osmometrically in acetone).
Angle of optical rotation: 0°
Thin-layer chromatography on silical gel:

$R_f$—0.42 (system: chloroform/acetone, 1:1)
$R_f$=0.59 (system: ethyl acetate/butanone/formic acid/water, 5:3:1:1)

Ultraviolet spectrum (in methanol):
$\lambda$ max$_1$=239 m$\mu$ (1 g. $I/I_0$=0.76, 1 g. $\epsilon$=5.4814)
$\lambda$ max$_2$=316 m$\mu$ (1 g. $I/I_0$=0.88, 1 g. $\epsilon$=5.5441)

Infrared spectrum (in KBr): see attached drawing.

The substance is soluble in chloroform, ether, methanol, acetone, ethanol and dimethylformamide. It is sparingly soluble in tetrahydrofurane and benzene. It is insoluble in petroleum ether and water.

With acids, the substance forms stable salts. For example, upon introduction of hydrogen chloride gas into the ether solution, the hydrochloride separates in the form of a pure white precipitate. It can be recrystallized from 60% alcohol to yield fine needles which decompose at temperatures above 230° C. In addition to hydrochloric acid, other inorganic and organic acids, for example hydrobromic acid, sulfuric acid, amidosulfonic acid or acetic acid, are likewise suitable for salt formation.

The substance has a strong spasmolytic activity which, in the isolated Guinea pig's ileum, is 3 to 5 times stronger than the activity of papaverine. The substance also has an excellent vasodilatatory action which, in the perfusion test on an isolated rabbit's ear and as regards the increase of outflowing perfusate, is 3 times stronger than that of papaverine. In the perfusion test in a dog's rear leg, it has the same activity as papaverine, but the increase in perfusion is maintained for a longer period.

Owing to its spasmolytic properties, the new substance may be used, for example, for the treatment of colics such as those of the gall bladder and of the kidneys. The vasodilatatory properties of the substance permit its use for the treatment of disorders of the blood circulation and for relieving the heart and the blood circulation.

The substance can be administered perorally or intravenously. For oral administration, especially tablets or dragées are used which contain the active substance in free form or in form of a salt, especially the hydrochloride, and the usual pharmaceutical adjuvants and carriers such as talc, starch, lactose, etc. For intravenous administration, aqueous solutions of the hydrochloride are preferably used.

The following examples illustrate the invention but they are not intended to limit it thereto:

EXAMPLE 1

247 g. of plant material of *Hazunta graciliflora* were freed from fatty substances by means of 2 liters of petroleum ether and then extracted with 2 liters of chloroform in a Soxhlet extractor. The resulting yellow brown solution was dried over sodium sulfate, filtered and evaporated to dryness. The yield was 9 g. The residue was vigorously stirred for 30 minutes, at 35–40° C., with 100 ml. of 1 N-sulfuric acid. The acid solution was then filtered with suction through a filter layer (Seitz filter K3). The deep red filtrate was brought to pH 10.5 by slow addition of caustic soda, which provoked the separation of a lemon-yellow precipitate. It was filtered off with suction, washed with water and dried at 60° C. under reduced pressure (yield 2.8 g.). This precipitate was then extracted with 50 ml. of ether in a Soxhlet apparatus. A light yellow solution resulted which was filtered and concentrated by evaporation to dryness (yield 1.546 g.).

The residue was further fractionated by chromatography on 15 g. of silical gel (Merck, 0.2–0.5 mm. diameter). The active substance was eluted with the system chloroform/acetone in a ratio of 9:1. It crystallized from acetone or ethanol in the form of colorless leaflets melting at 235° C. (yield: 0.196 g.).

EXAMPLE 2

700 g. of plant material of *Hazunta graciliflora* were extracted with 4 litres of methanol in a Soxhlet apparatus, after previous extraction with petroleum ether. The extract was filtered and concentrated by evaporation. (Yield: 23 g.) The residue was stirred vigorously for one hour, at 40–45° C., with 150 ml. of 1 N-hydrochloric acid. The solution was filtered and allowed to stand overnight, during which time a small amount of a resinous precipitate separated which was removed by filtration through a filter layer (Seitz filter K3). The solution was brought to pH 10.5 by adding caustic potash, which provoked separation of a light yellow precipitate which was filtered, washed with water and dried under reduced pressure (yield: 7.3 g.). The precipitate was extracted in a Soxhlet apparatus with 100 ml. of chloroform. The resulting dark red-brown solution was concentrated by evaporation (yield 4.9 g.) and the residue was chromatographed on 50 g. of silical gel (Merck, diameter 0.2–0.5 mm.) (solvent system: chloroform/acetone, 4:1). Fractions of 25 ml. each were collected. From fractions 24–26, the active substance crystallized upon evaporation in the form of light cream-colored leaflets, which could be recrystallized from acetone or ethanol. Yield: 0.513 gram. The substance was found to be identical, chemically as well as pharmacologically, with the substance obtained according to Example 1.

EXAMPLE 3

25 kg. of stems of *Hazunta graciliflora* were freed from fatty substances by means of petroleum ether and then extracted with 50 liters of chloroform in a large size extractor. The solution was filtered and concentrated by evaporation to dryness under reduced pressure (yield 798 g. of a dark brown resin). This resin was vigorously stirred for 2 hours at 30° C. with 10 l. of 0.5 N-sulfuric acid. The mixture was filtered and the residue was rejected. The deep red-brown solution was brought to pH 10 by means of caustic soda, the yellow precipitate that had formed was filtered off with suction, washed with water and dried at 50° C. under reduced pressure. (Yield: 256 g.) The precipitate was extracted in a Soxhlet apparatus with 2 liters of ether, the light yellow ether extract was filtered, dried over sodium sulfate, concentrated by evaporation (yield 134 g.) and chromatographed on 2 kg. of aluminum oxide (Woelm, neutral, activity degree 1). The active fraction could be eluted with acetone or chloroform/methanol (3:1) and was recrystallized from acetone. Yield: 18.6 grams.

I claim:
1. A process for the isolation of a naturally-occurring physiologically active substance having spasmolytic and vasodilatory properties which comprises extracting dry plant material from *Hazunta graciliflora* with an aliphatic lower alcohol or aliphatic halogenated hydrocarbon; evaporating the extract to dryness; extracting the residue with a dilute mineral acid; rendering the acid extract alkaline to precipitate the active substance; extracting the precipitate with ether or chloroform; and chromatographing the extract on a column of silica gel or aluminum oxide for further purification.

2. A physiologically active substance having spasmolytic and vasodilatory properties and occurring naturally in *Hazunta graciliflora*, and salts of said active substance formed with physiologically tolerated acids, said substance having the following properties:
   (a) elemental analysis
      C: 69.8%
      H: 7.0%
      O: 15.1%
      N: 8.1%
   (b) melting point: 235° C.;
   (c) molecular weight: 398 (osmometrically in acetone);
   (d) ultraviolet maxima (in methanol): 239 and 316 millimicrons;
   (e) infrared spectrum (in KBr): as in the accompanying figure;
   (f) thin layer chromatography on silica gel: $R_f = 0.42$ (system: chloroform/acetone, 1:1)
      $R_f = 0.59$ (system: ethyl acetate/butanone/formic acid/water, 5:3:1:1);
   (g) solubility: soluble in chloroform, ether, methanol, acetone, ethanol, and dimethylformamide; sparingly soluble in tetrahydrofurane and benzene; insoluble in petroleum ether and water.

References Cited

M. Pichon, "Notulae Systematicea" XIII (1948), p. 207.

M. Pichon, "Memoires du Museum National d'Histoire Naturelle," 27 (1948), p. 222.

STANLEY J. FRIEDMAN, Primary Examiner

U.S. Cl. X.R.

260—236.5